United States Patent
Hasegawa et al.

[11] Patent Number: 6,126,828
[45] Date of Patent: Oct. 3, 2000

[54] METHOD AND APPARATUS FOR TREATING ORGANIC WASTE WATER

[75] Inventors: Susumu Hasegawa; Kenji Katsura; Masahiko Miura, all of Kobe, Japan

[73] Assignee: Shinko Pantec Co., Ltd., Kobe, Japan

[21] Appl. No.: 09/184,370

[22] Filed: Nov. 2, 1998

[51] Int. Cl.⁷ .................................. C02F 3/02; C02F 11/02
[52] U.S. Cl. ........................ 210/603; 210/607; 210/623; 210/903; 210/908; 210/205
[58] Field of Search ..................................... 210/603, 607, 210/623, 624, 626, 903, 908, 916, 150, 151, 205

[56] References Cited

U.S. PATENT DOCUMENTS

| | | | |
|---|---|---|---|
| 3,930,998 | 1/1976 | Knopp et al. | 210/609 |
| 4,894,162 | 1/1990 | Cournoyer et al. | 210/626 |

FOREIGN PATENT DOCUMENTS

| | | |
|---|---|---|
| 61133197 | 6/1986 | Japan . |
| 6-206088 | 7/1994 | Japan . |
| 9-010791 | 1/1997 | Japan . |
| 9-099298 | 4/1997 | Japan . |
| 9-276887 | 10/1997 | Japan . |
| 10 192889 | 7/1998 | Japan . |
| 11 000690 | 1/1999 | Japan . |
| WO 98/33745 | 8/1998 | WIPO . |

OTHER PUBLICATIONS

*Sewage Service Project—Design Guide and Explanation*, vol. 2, pp. 218–241 (1994).

Primary Examiner—David A. Simmons
Assistant Examiner—Frank M. Lawrence
Attorney, Agent, or Firm—Marshall, O'Toole, Gerstein, Murray & Borun

[57] ABSTRACT

A method and an apparatus for treating an organic waste water capable of deodorizing an exhaust gas diffused into an atmosphere is provided, wherein heat energy loss is small and the amount of an organic or inorganic nitrogen compounds in an effluent from the apparatus is low. In the method of the present invention, an organic waste water is nitrified in a nitrification device 8, denitrified in a denitrification device 9, and subjected to an aerobic biological treatment in an aeration tank 10, and then the treated mixture is solid-liquid separated in a solid-liquid separation device 3. A portion of an excess sludge separated in solid-liquid separation device 3 is solubilized at a high temperature in a solubilization device 6, and the solution after a solubilization treatment is returned to denitrification device 9 and a gas exhausted from solubilization device 6 is charged into nitrification device 8.

12 Claims, 3 Drawing Sheets

METHOD AND APPARATUS FOR TREATING ORGANIC WASTE WATER

FIELD OF THE INVENTION

The present invention relates to a method and an apparatus for treating organic wastes containing organic solids by means of biological digestion. More specifically, the present invention provides a method and an apparatus for treating an organic waste water comprising an organic waste sludge including, for example, an organic sludge containing a raw sludge, a biological sludge discharged from a sewage treatment plant, a night soil treatment plant, or the like, and an organic sludge discharged from a waste water treatment process in a food factory, a chemical factory, or the like.

DESCRIPTION OF THE PRIOR ART

A method of treating organic wastes mentioned above that has been used biologically digests organic components in an organic sludge by means of an aerobic or anaerobic microbial decomposition, such as an aerobic digestion method, an anaerobic methane fermentation method, or the like, to convert organic matter into a gas composition, such as carbon dioxide gas, methane gas, or the like. Thereafter, the resulting excess sludge containing a microbial biomass, which predominantly comprises microbial cells, and the sludge comprising an untreated residual sludge which has been generated by the biological digestion of the organic waste water, are suitably treated by means of solid-liquid separation in a precipitation tank. While the resulting liquid portion from the separation is suitably processed, the excess sludge portion is disposed of at sea or in a landfill. However, disposing such excess sludge at sea leads to environmental problems. Therefore, disposing of excess sludge at sea essentially has been prohibited because of global environmental protection initiatives. Furthermore, in case of landfills, it has become increasingly difficult to secure the necessary land year after year.

In view of such circumstances, applicant has filed a patent application relating to a method and an apparatus for treating an activated sludge, as shown in FIG. 3. As set forth in Japanese Laid-Open Patent Publication No. 7-163355, the disclosed method and apparatus comprises subjecting an organic waste water delivered from an organic waste water reservoir 1 to an aeration tank 2 for aerobic biological treatment, solid-liquid separating the treated mixture into a supernatant and a sludge in a solid-liquid separation device 3, returning a portion of the sludge separated in solid-liquid separation device 3 to aeration tank 2 through a recycle route 4, heat exchanging the excess sludge obtained by the separation in solid-liquid separation device 3 using a heat exchanger 5, solubilizing at a high temperature in a solubilization device 6, and returning the solution to aeration tank 2 through a return route 7. This patent application discloses a method and an apparatus for treating an activated sludge which is capable of drastically reducing the quantity of the excess sludge that is produced.

The method described in the above publication has disadvantages because the temperature in solubilization device 6 ranges from 60° C. to 70° C., and the top of solubilization device 6 is open. Therefore, the retained potential heat in solubilization device 6 can be lost with the exhaust gas diffused to the atmosphere. Energy losses can be large. Furthermore, the odor of an exhaust gas containing nitrogen compounds (which are attributed to the several proteins usually contained in the sludge) discharged from solubilization device 6 can be a problem.

In addition, it is also disadvantageous that a portion of the nitrogen compounds contained in the solution returned from solubilization device 6 to aeration tank 2 is discharged together with the supernatent discharged from solid-liquid separation device 3.

SUMMARY OF THE INVENTION

In view of such problems in the prior art, it is an aspect of the present invention to provide a method and an apparatus for treating an organic waste water which is capable of deodorizing an exhaust gas diffused into the atmosphere, wherein a heat energy loss is small, and organic or inorganic matter containing nitrogen that is present in the treated liquid to be discharged can be diminished.

In order to attain the aspect mentioned above, the present invention provides a method and an apparatus wherein an organic sludge is biologically treated, characterized in that a gas (i.e., a gas predominantly containing $NH_3$, i.e., ammonia, gas) that is discharged from a solubilization device is introduced into a nitrification device to convert $NH_3$ into $NO_2^-$ (nitrite) or $NO_3^-$ (nitrate), and to further convert the thus obtained $NO_2^-$ or $NO_3^-$ into $N_2$ (nitrogen gas) in a denitrification device. The method and apparatus reduces the quantity of the nitrogen-containing components in the effluent discharged from the treating system. Therefore, the heat of the gas exhausted from the solubilization device is effectively utilized for the nitrification in the nitrification device, and it is possible to deodorize the exhaust gas diffused into the atmosphere.

DESCRIPTION OF THE PREFERRED EMBODIMENT

Figure 1:
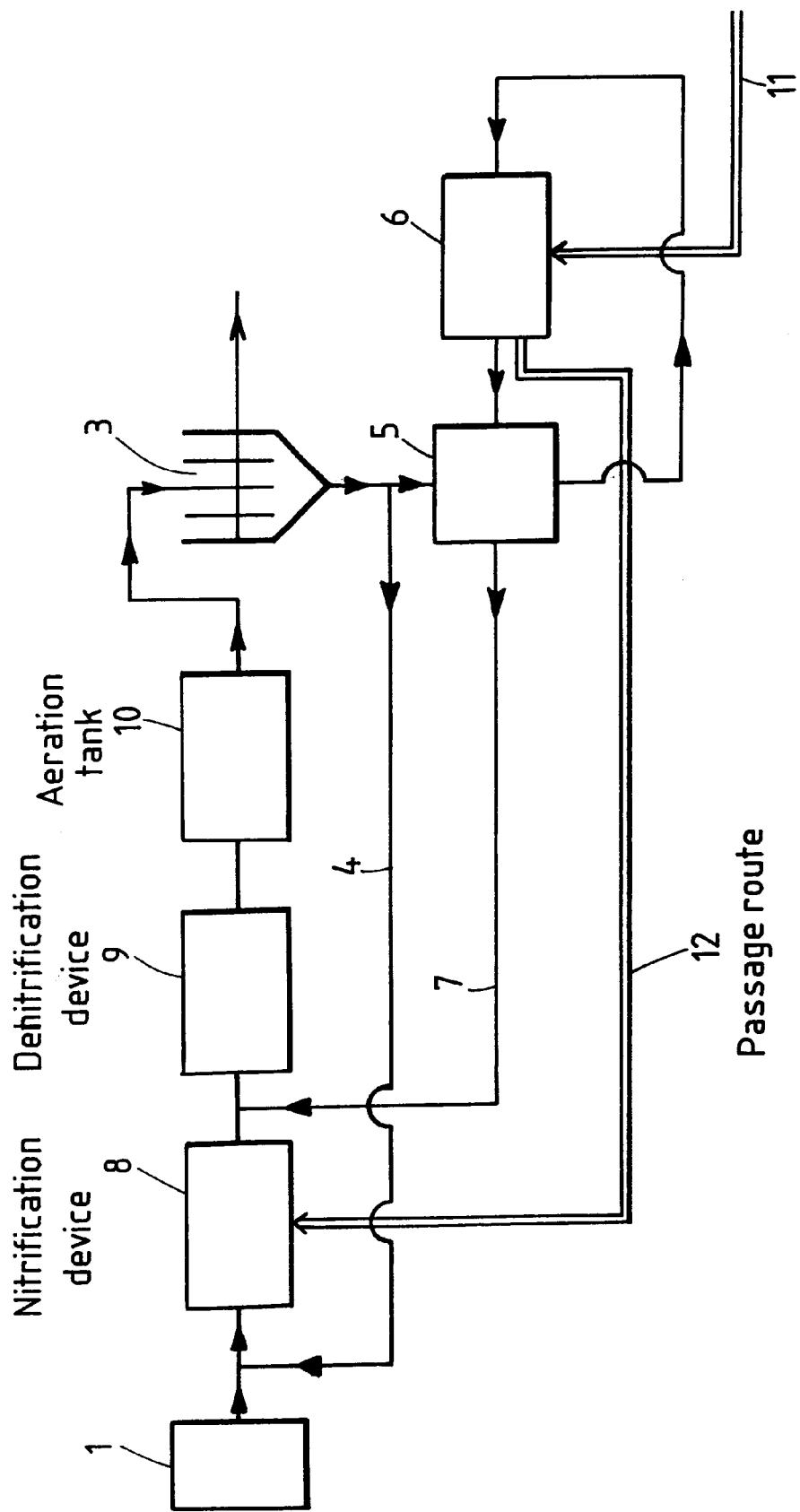
FIG. 1 is a schematic diagram showing one embodiment of the apparatus for treating an organic waste water of the present invention.

As the first aspect of the present invention, a method of biologically treating an organic waste water is provided. The method comprises solubilizing organic solids at a high temperature in a solubilization device, charging a gas exhausted from the solubilization device into a nitrification device to nitrify the ammonia in the gas; and returning a portion or all of the solution from the solubilization device into a denitrification device as a substrate for denitrification.

The second aspect of the present invention is to provide a method of treating an organic waste water comprising nitrifying the ammonia in the waste water in a nitrification device, introducing the nitrified effluent into a denitrification device to denitrify the nitrified product, subjecting the liquid after denitrification to an aerobic biological treatment in an aeration tank; solid-liquid separating this mixture after the biological treatment into a supernatent and a sediment sludge in a solid-liquid separation device, returning a portion of this sediment sludge to the nitrification device, solubilizing an excess sludge portion separated by the solid-liquid separation device at a high temperature in a solubilization device and returning the solution after the solubilization treatment to the denitrification device as a substrate for denitrification, charging a gas exhausted from the solubilization device into the nitrification device to nitrify the ammonia in the gas.

The third aspect of the present invention is to provide a method of treating an organic waste water comprising denitrifying an organic waste water in a denitrification device, introducing the denitrified effluent into a nitrification device to nitrify the ammonia in the denitrified effluent and returning a portion of the nitrified mixture in the nitrification device into the denitrification device to denitrify the nitrified product while solid-liquid separating the residue of the nitrified mixture into a supernatant and a sediment sludge in a solid-liquid separation device, returning a portion of this separated sludge into the denitrification device, solubilizing an excess sludge portion separated in the solid-liquid separation device at a high temperature in a solubilization device, returning the solution after the solubilization treatment into the denitrification device as a substrate for denitrification, and charging a gas exhausted from the solubilization device into the nitrification device to nitrify the ammonia in the gas.

The fourth aspect of the present invention is to provide the method of treating an organic waste water of any of the above methods, wherein the solubilization treatment in the solubilization device is performed in a closed reactor.

The fifth aspect of the present invention is to provide an apparatus for treating an organic waste water comprising a solubilization device for solubilizing organic solids at a high temperature, and a nitrification device as a pre- or post-treatment device of a denitrification device, with a return route for returning a portion or all of the solution from the solubilization device to the denitrification device and a passage route for charging a gas exhausted from the solubilization device to the nitrification device.

The sixth aspect of the present invention is to provide an apparatus for treating an organic waste water comprising a nitrification device, a denitrification device, an aeration tank, a solid-liquid separation device, and a solubilization device, which are arranged in this order to be operatively connected with each other, with a recycle route for returning a portion of a sludge separated by the solid-liquid separation device to the nitrification device, a return route for returning the solution from the solubilization device to the denitrification device, and a passage route for charging a gas exhausted from the solubilization device to the nitrification device.

The seventh aspect of the present invention is to provide an apparatus for treating an organic waste water comprising a denitrification device, a nitrification device, a solid-liquid separation device, and a solubilization device, which are arranged in this order to be operatively connected with each other, with a return route for returning a portion of the nitrified liquid from the nitrification device to the denitrification device, a recycle route for returning a portion of a sludge separated by the solid-liquid separation to the denitrification device, a return route for returning the solution from the solubilization device to the denitrification device, and a passage route for charging a gas exhausted from the solubilization device to the nitrification device.

Further aspect of the present invention is to provide the apparatus as above mentioned for treating an organic waste water wherein the solubilization device is a closed reactor.

According to the above first aspect of the present invention, the $NH_4^+$ (ammonium) component in the organic waste water is converted into $NO_2^-$ (nitrite) or $NO_3^-$ (nitrate) by a nitrifier in a nitrification device, and $NO_2^-$ or $NO_3^-$ then is converted into $N_2$ (nitrogen gas) by a denitrifier with a hydrogen donor in the denitrification device. A portion or all of the treated solution solubilized by thermophilic microorganisms in the solubilization device then is returned to the denitrification device and subjected to the identical denitrification treatment as described above. While solubilization proceeds, a gas exhausted from the solubilization device is charged into the nitrification device and subjected to the identical nitrification treatment as described above. Thus, a treated liquid containing essentially no nitrogen compounds is discharged from the solid-liquid separation device. Furthermore, since the gas exhausted from the solubilization device is diffused into the atmosphere after being introduced into the nitrification device, the amount of heat escaping from the solubilization device is low. Additionally, the odor of the gas diffused into the atmosphere is drastically reduced.

In cases wherein the amount of the organic matter present in the raw waste water is low, a method wherein denitrification is carried out after nitrification is preferred, in accordance with the second aspect of the invention.

However, when the amount of organic matter contained in raw waste water is large, microorganisms which can decompose the organic compounds are increased during the treatment, thus the nitrification by a nitrifier is inhibited. Therefore, a method wherein removing the organic matter contained in the raw waste water in the denitrification device is performed first, and then nitrification is conducted using a nitrifier in the nitrification device, is preferred in accordance with the third aspect of the invention. In this case, the treated solution after the nitrification treatment is returned to the denitrification device, thus the treated liquid containing almost no nitrogen compounds can be discharged outside from the solid-liquid separation device.

Moreover, when the solubilization treatment in the solubilization device is performed in a closed reactor, energy losses can be substantially reduced because heat in the solubilization device is not diffused into the atmosphere.

EXAMPLES

While examples of the present invention are described below, the scope of the present invention should not be restricted thereto.

Figure 3:
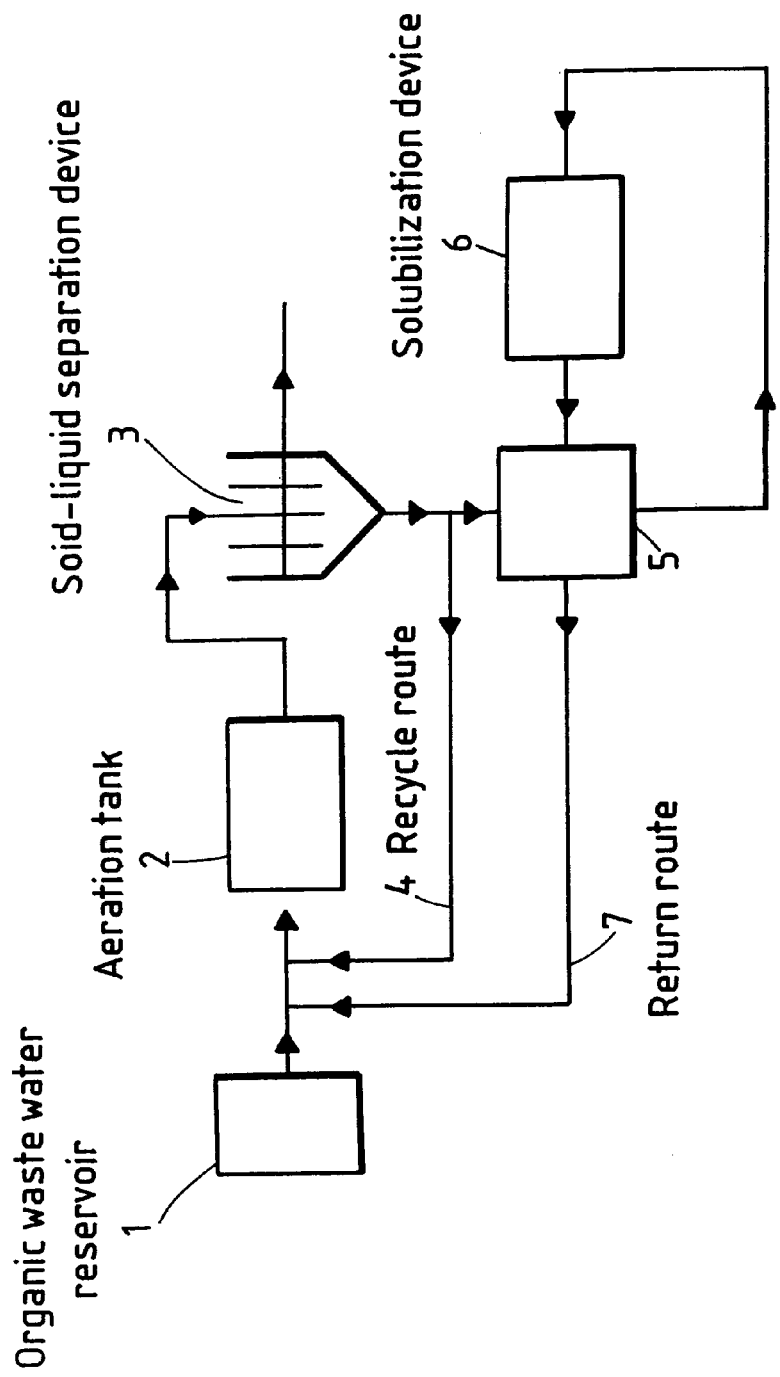
FIG. 3 is a schematic diagram showing an apparatus for treating an organic waste water according to the prior art.

FIG. 1 is a schematic diagram showing one embodiment of an apparatus of the present invention for treating an organic waste water. An identical reference number is assigned to the same element as that of FIG. 3. In this first example, a nitrification device 8, a denitrification device 9, and an aeration tank 10 are arranged in this order between an organic waste water reservoir 1 and a solid-liquid separation device 3. A portion of the sludge separated in solid-liquid separation device 3 is returned to nitrification device 8 through a recycle route 4, while the solution from a solubilization device 6 is returned to denitrification device 9 through a return route 7. Furthermore, air charged into solubilization device 6 through a route 11 is charged into nitrification device 8 through a passage route 12. Furthermore, the solubilization device in this apparatus is closed. Organic waste water was treated using an apparatus in accordance with this first example as constituted above, and a conventional apparatus for treating an organic waste water according to the prior art shown in FIG. 3. The results are described below.

Nitrification device 8, denitrification device 9, and aeration tank 10 of the present invention were 15 liter, 20 liter, and 5 liter square-shaped vessels, respectively, made of transparent polyvinyl chloride resin. Solubilization device 6 was a 2 liter cylindrical container made of glass. On the other hand, an aeration tank 2 of the apparatus according to the prior art was a 40 liter, square-shaped vessel made of transparent polyvinyl chloride resin and solubilization device 6 was identical to that of the present invention described above.

When the present method was performed, all of the solution from solubilization device 6 was returned to denitrification device 9, and gas exhausted from solubilization device 6 was introduced into nitrification device 8. On the other hand, in a treatment apparatus according to the prior art, the solution from solubilization device 6 was returned to aeration tank 2, while the gas exhausted from solubilization device 6 was diffused into the atmosphere and subjected to exhaust gas treatment in an additional step. Further, the temperature in solubilization device 6 was maintained at about 65° C. by a heater (not shown in the Figures). The residence time of the liquid in solubilization device 6 was 2.2 days, and total residence time in the whole apparatus was 8 days. Changes in the amount of total organic carbon (TOC), and in the total amount of nitrogen (T-N), are respectively shown in Table 1 below.

TABLE 1

|  | Raw Waste Water | Prior Art | Present Invention |
|---|---|---|---|
| TOC (mg/l) | 930 | 75 | 54 |
| T-N (mg/l) | 110 | 87 | 14 |

As shown in Table 1, according to the present invention, both of the amount of carbon and nitrogen in the treated liquid can be reduced when compared to a method conducted using an apparatus of the prior art. The effect of reducing the amount of nitrogen is particularly large. Additionally, the odor of the exhaust gas also can be reduced by the method of the present invention because the gas exhausted from solubilization device 6 is returned to nitrification device 8. Furthermore, the high temperature (50° C.) of the gas exhausted from solubilization device 6 makes it possible to augment the nitrification rate in nitrification device 8. In addition, a hydrogen donor (for example, $CH_3OH$ and the like) applied in denitrification device 9 can be reduced because a large amount of the biodegradable organic matter is contained in the solution discharged from solubilization device 6.

Figure 2:
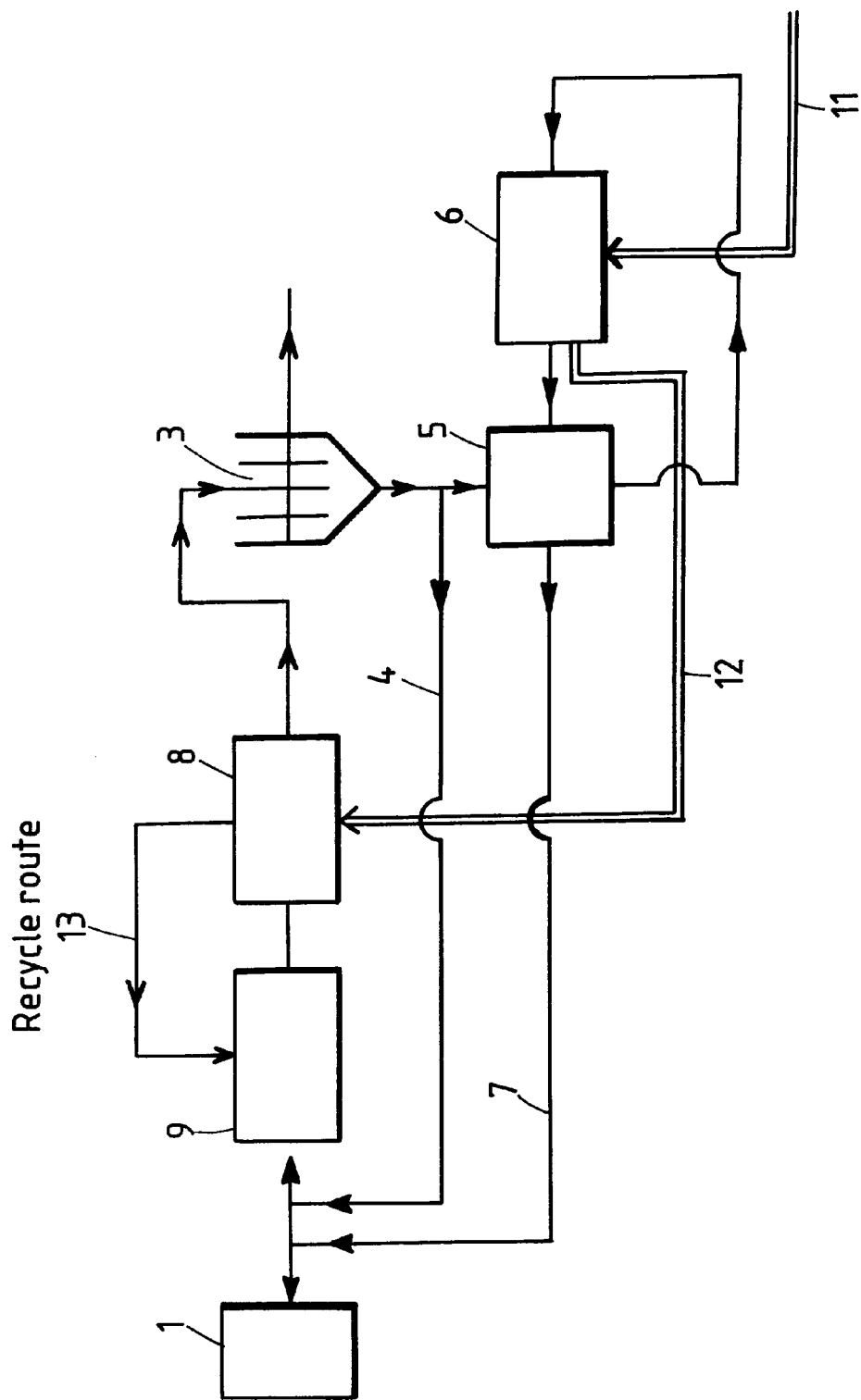
FIG. 2 is a schematic diagram showing a second embodiment of the apparatus for treating an organic waste water of the present invention.

FIG. 2 is a schematic diagram showing another example of an apparatus for treatment of the present invention. In this example, denitrification device 9 is provided prior to nitrification device 8, and the aeration tank is not provided, and further, a recycle route 13 from nitrification device 8 to denitrification device 9 is provided. When the amount of organic matter contained in the raw waste water is large, the nitrification treatment, which uses nitrifier in nitrification device 8, can be performed smoothly because the organic matter first can be treated in denitrification device 9.

The nitrification device and the denitrification device were separately provided in the examples shown in FIG. 1 and FIG. 2, however, they can also be provided integrally. For example, a device comprising one tank wherein the lower portion serves as a denitrification device, and the upper portion serves as a nitrification device, can be employed. Furthermore, solid-liquid separation was performed by gravity sedimentation using a precipitator, but is not limited thereto. Solid-liquid separation also can be performed by centrifugation, membrane separation, or the like.

Consequently, the present invention as described above can reduce a loss of heat energy, and a nitrification rate can be augmented when a waste water containing an organic sludge is biologically treated. Further, the amount of the hydrogen donor to be applied in the denitrification device also can be reduced, and the amount of the organic or inorganic nitrogen compounds in the effluent from the apparatus is small. Moreover, deodorizing an exhaust gas released to the atmosphere can be accomplished.

Although the present invention has been described by way of example with reference to the accompanying drawings, it is to be understood that various changes and modifications will occur to those skilled in the art. Therefore, unless otherwise such changes and modifications depart from the scope of the invention, they should be construed as being included therein.

What is claimed is:

1. A method of biologically treating an organic waster water comprising solubilizing organic solids at a high temperature by thermophilic micro-organisms in a solubilization device to form a solution; charging a gas exhausted from the solubilization device to a nitrification device to nitrify ammonia present in the gas; and returning at least a portion of the solution from the solubilization device to a denitrification device as a substrate for the denitrifier.

2. The method of treating an organic waste water according to claim 1 wherein the solubilization device comprises a closed reactor.

3. A method of treating an organic waste water comprising nitrifying ammonium in the waste water in a nitrification device to form a nitrified effluent; introducing the nitrified effluent into a denitrification device to denitrify the nitrified effluent; subjecting the denitrified effluent to an aerobic biological treatment in an aeration tank to form a mixture; solid-liquid separating the mixture after the biological treatment into a supernatant and a sediment sludge in a solid-liquid separation device; returning a portion of the sediment sludge to the nitrification device; solubilizing an excess sludge portion separated by the solid-liquid separation device at a high temperature by thermophilic microorganisms in a solubilization device and returning the solution after the solubilization treatment to the denitrification device as a substrate for the denitrifier; and charging a gas exhausted from the solubilization device into the nitrification device to nitrify ammonia in the gas.

4. The method of treating an organic waste water according to claim 3 wherein the solubilization device comprises a closed reactor.

5. A method of treating an organic waste water comprising denitrifying an organic waste water in a denitrification device to form a denitrified effluent; introducing the denitrified effluent into a nitrification device to nitrify the ammonium in the denitrified effluent and returning a portion of the nitrified mixture in the nitrification device into the denitrification device to denitrify the nitrified product while solid-liquid separating the residue of the nitrified mixture into a supernatant and a sediment sludge in a solid-liquid separation device; returning a portion of this separated sludge into the denitrification device; solubilizing an excess sludge portion separated in the solid-liquid separation device at a high temperature by thermophilic microorganisms in a solubilization device; returning the solution after the solubilization treatment into the denitrification device as a substrate for denitrifier; and charging a gas exhausted from the solubilization device into the nitrification device to nitrify ammonia in the gas.

6. The method of treating an organic waste water according to claim 5 wherein the solubilization device comprises a closed reactor.

7. An apparatus for treating an organic waste water comprising a solubilization device for solubilizing organic solids at a high temperature by thermophilic microorganisms and a nitrification device as a pretreatment or a posttreatment device of a denitrification device, having a return route for returning at least a portion of a solution formed in the solubilization device to the denitrification device, and a passage route for charging a gas exhausted from the solubilization device to the nitrification device.

8. The apparatus for treating an organic waste water according to claim 7 wherein the solubilization device is a closed reactor.

9. An apparatus for treating an organic waste water comprising a nitrification device, denitrification device, an aeration tank, a solid-liquid separation device for solubilizing organic solids at a high temperature by thermophilic microorganisms, and a solubilization device, which are operatively connected in this order, with a recycle route for returning a portion of a sludge separated by the solid-liquid separation device to the nitrification device, a return route for returning a solution formed in the solubilization device to the denitrification device, and a passage route for charging a gas exhausted from the solubilization device to the nitrification device.

10. The apparatus for treating an organic waste water according to claim 9 wherein the solubilization device is a closed reactor.

11. An apparatus for treating an organic waste water comprising a denitrification device for solubilizing organic solids at a high temperature by thermophilic microorganisms, a nitrification device, a solid-liquid separation device, and a solubilization device, which are operatively connected in this order, with a return route for returning a portion of a nitrified liquid found in the nitrification device to the denitrification device, a recycle route for returning a portion of a sludge separated by the solid-liquid separation device to the denitrification device, a return route for returning a solution formed in the solubilization device to the denitrification device, and a passage route for charging a gas exhausted from the solubilization device to the nitrification device.

12. The apparatus for treating an organic waste water according to claim 11 wherein the solubilization device is a closed reactor.

* * * * *